A. LYSIAK.
JOINT OR CONNECTION.
APPLICATION FILED JULY 11, 1921.

1,428,792.  Patented Sept. 12, 1922.

Inventor
A. Lysiak
By J. W. L. Bryant
Attorney

Patented Sept. 12, 1922.

1,428,792

UNITED STATES PATENT OFFICE.

ANTONI LYSIAK, OF MANCHESTER, MASSACHUSETTS.

JOINT OR CONNECTION.

Application filed July 11, 1921. Serial No. 483,784.

*To all whom it may concern:*

Be it known that I, ANTONI LYSIAK, a citizen of Poland, residing at Manchester, in the county of Essex and State of Massachusetts, have invented certain new and useful Improvements in Joints or Connections, of which the following is a specification.

This invention relates to certain new and useful improvements in joints or connections and has particular reference to the provision of improved means for effectively connecting contiguous pieces of work such as overlapping structural elements of wooden building, articles of furniture, etc.

The invention primarily consists in a stud bolt having a head and an octangular screw threaded stem connected by a neck portion of reduced size with means supported by the bolt at the neck portion thereof for accommodation at the corners of a square hole whereby backing of the bolt out of the work or joined members is prevented and a neat appearance had.

The invention consists in the novel form, combination and arrangement of parts hereinafter more fully described, shown in the accompanying drawing and claimed.

Figure 1:
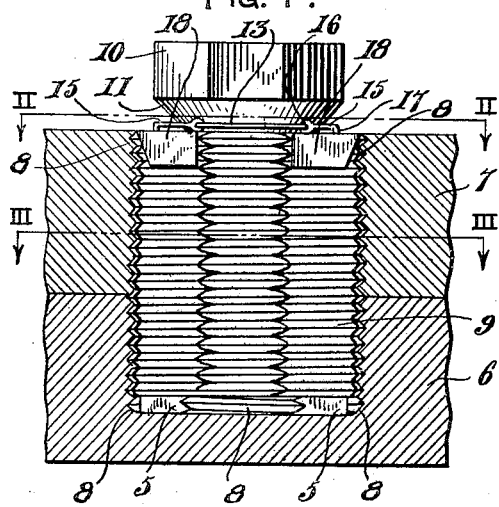
Figure 4:
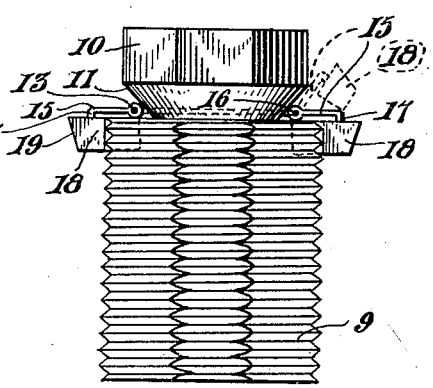
Figure 2:
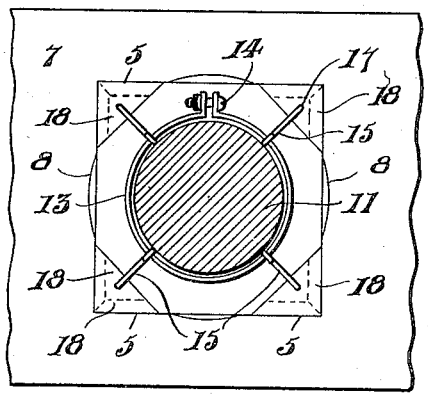
Figure 5:
Figure 3:
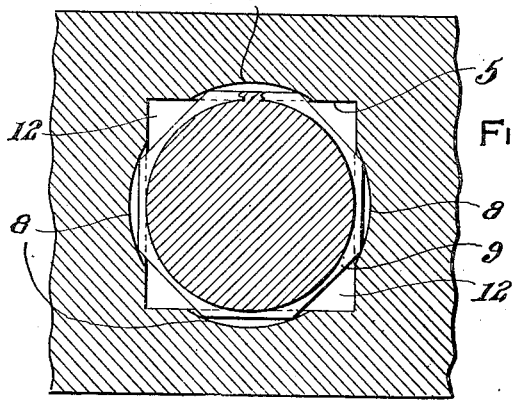
Figure 6:
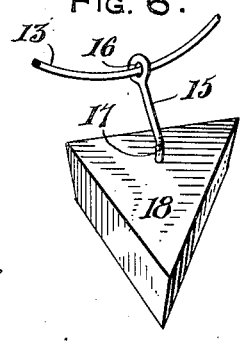

In the drawing forming a part of this application and in which like characters of reference indicate corresponding parts throughout the several views, Figure 1 is a sectional view through two joined members and showing said members connected by a bolt constructed in accordance with the present invention, with the bolt shown in elevation, Figure 2 is a transverse sectional view taken substantially upon line II—II of Figure 1, Figure 3 is a view similar to Figure 2 taken upon line III—III of Figure 1, Figure 4 is a view of the bolt in side elevation and with one half of the corner member supporting ring removed together with the corner members carried by said half of the ring, Figure 5 is an elevational view of the supporting or attaching ring for the corner members, and Figure 6 is a fragmentary perspective view showing a portion of the attaching ring and one of the corner members.

Referring more in detail to the several views, the invention contemplates the formation of a rectangular opening 5 in each of a plurality of members 6 and 7 to be connected or joined with said openings alined, the four sides of the opening 5 being provided with segmental threads as at 8 midway between the corners of the openings. These openings are adapted for reception of a special form of bolt which includes an octangular stem or shank 9 having a continuous screw thread thereon and provided at one end with an angular head 10, the head and shank being connected by a reduced portion in the form of a neck 11, and the stem 9 being of such size as to engage the threaded portions 8 of the members 6 and 7, leaving triangular spaces at the corners of the openings 5 as at 12.

A split attaching ring 13 having its ends connected by a nut and bolt or the like as at 14 is disposed about the neck portion 11 and has a plurality of arms 15 pivoted thereto as at 16, the outer ends of the arms 15 being bent at a right angle as at 17 and secured to triangular corner members 18 arranged to swing into the triangular spaces 12 and, in conjunction with the stem 9 to completely close the openings 5 adjacent the head 10 while at the same time preventing accidental rotation of the bolt and thereby providing a very efficient connection between the members 6 and 7.

In use, the coincident openings 5 in the members 6 and 7 are formed in any suitable manner such as by means of a square hole cutter set forth in my patent granted to me on January 3, 1922, and bearing No. 1,402,510. A wrench is then engaged with the head 10 so as to thread the stem 9 into the openings 5 so as to forcibly form the threads 8 providing the material of the members 6 and 7 will permit this. Otherwise, the threads 8 may be suitably formed in advance by a proper tool, and the bolt is screwed home until the outer end of the stem 9 becomes flush with the adjacent surface of the member 7. The triangular corner members 18 are then swung into the triangular spaces 12 so as to close said spaces and at the same time provide efficient means for preventing reverse rotation of the bolt. The outer edges of the triangular members 18 may be beveled as at 19 to permit the swinging of said members into place. By making said triangular members 18 of proper size so that the same will have to be slightly forced into place, outward swinging of the same accidentally is rendered unlikely. From the foregoing description, it is believed that the construction and operation as well as the advantages of the present invention will be readily understood and appreciated by those skilled in the art. Minor changes may be made without departing from the spirit and scope of the invention.

What is claimed as new is:

1. In combination with a pair of members arranged in contiguous relation and having coincident square openings with the walls of the openings formed with segmental threaded portions substantially midway between the corners of the openings, a bolt having a stem of octangular form and provided with a continuous thread formed to be threaded into said openings in engagement with the segmental threaded portions, and substantially triangular members hinged to the outer end of the bolt so as to swing into and out of the corner portions of the adjacent opening whereby said opening is completely closed and accidental rotation of the bolt prevented.

2. In combination with a pair of members arranged in contiguous relation and having coincident square openings with the walls of the openings formed with segmental threaded portions substantially midway between the corners of the openings, a bolt having a stem of octangular form and provided with a continuous thread formed to be threaded into said openings in engagement with the segmental threaded portions, said bolt being provided with an angular head connected to the stem or shank by means of a reduced portion in the form of a neck, a securing ring clamped about said neck, a plurality of radial arms pivoted to said securing ring, and triangular corner members fixed upon the outer ends of said arms and adapted to swing into the corner portions of the adjacent opening.

3. In combination with a pair of members arranged in contiguous relation and having coincident square openings with the walls of the openings formed with segmental threaded portions substantially midway between the corners of the openings, a bolt having a stem of octangular form and provided with a continuous thread formed to be threaded into said openings in engagement with the segmental threaded portions, said bolt being provided with an angular head connected to the stem or shank by means of a reduced portion in the form of a neck, a securing ring clamped about said neck, a plurality of radial arms pivoted to said securing ring, triangular corner members fixed upon the outer ends of said arms and adapted to swing into the corner portions of the adjacent opening, the outer ends of said arms being bent at right angles and attached to the other portions of said triangular corner members.

4. In combination with a pair of members arranged in contiguous relation and having coincident square openings with the walls of the openings formed with segmental threaded portions substantially midway between the corners of the openings, a bolt having a stem of octangular form and provided with a continuous thread formed to be threaded into said openings in engagement with the segmental threaded portions, said bolt being provided with an angular head connected to the stem or shank by means of a reduced portion in the form of a neck, a securing ring clamped about said neck, a plurality of radial arms pivoted to said securing ring, triangular corner members fixed upon the outer ends of said arms and adapted to swing into the corner portions of the adjacent opening, the outer edges of said triangular corner members being beveled.

In testimony whereof I affix my signature.

ANTONI LYSIAK.